Feb. 14, 1967   A. J. BOUTHILLER   3,303,853
VALVE ASSEMBLY
Filed Jan. 28, 1964
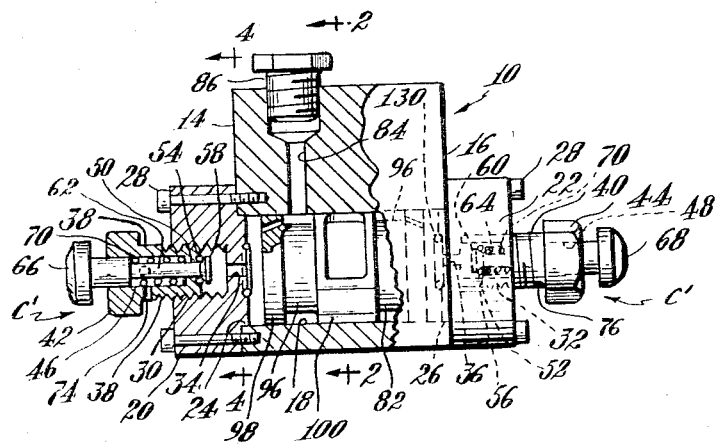
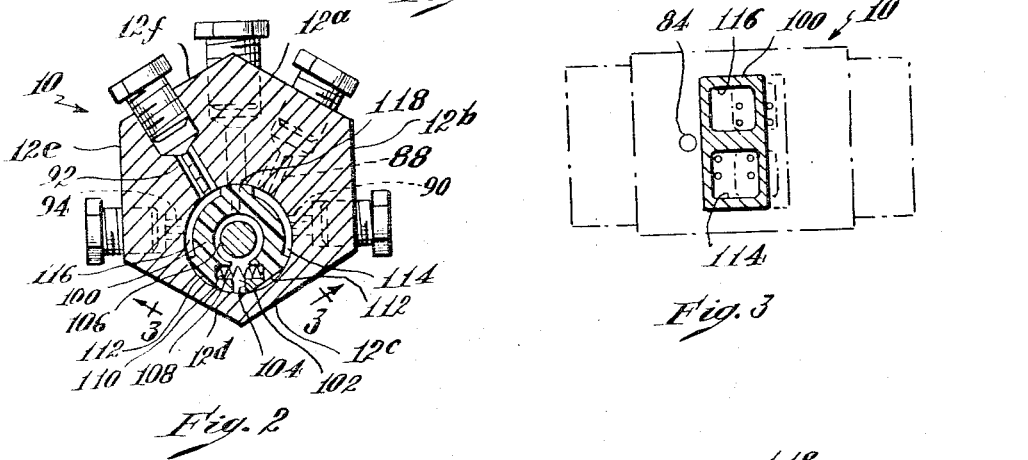
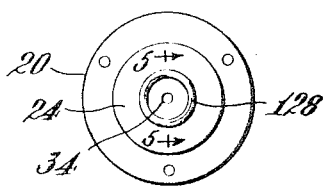
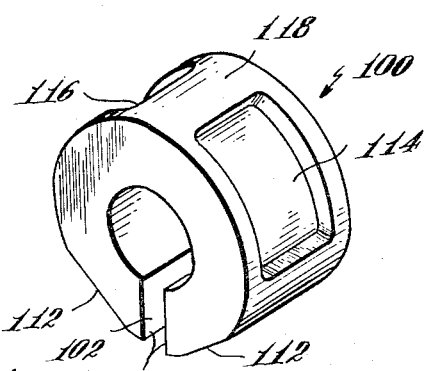
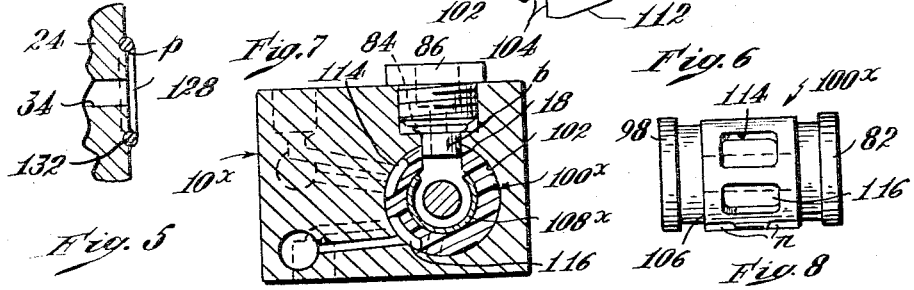

United States Patent Office 3,303,853
Patented Feb. 14, 1967

3,303,853
VALVE ASSEMBLY
Auguste J. Bouthiller, Worcester, Mass., assignor to Imperial Machine Corporation, Worcester, Mass., a corporation of Massachusetts
Filed Jan. 28, 1964, Ser. No. 340,619
7 Claims. (Cl. 137—625.48)

This invention relates to valves of the kind disclosed in my copending application Serial No. 340,620 of even date for controlling the operation of machines and mechanisms or for supplying fluid to industrial processes and the like.

The valve assembly shown in the aforementioned copending application contains a valve chamber within which there is slidably disposed a pilot of the spool or piston type. The ends of the chamber are flat and contain exhaust ports. The piston or spool has on it, as a valve element, a valve shoe movable therewith relative to ports in the wall of the chamber, and the principal objects of this invention are to provide an improved kind of shoe which is of very light weight; is long wearing; has a low coefficient of friction; requires no lubrication; is easy to manufacture to close tolerances; is inexpensive; and is comprised of readily available material.

As herein illustrated, the valve shoe is in the form of a sleeve-like ring disposed about and situated in a groove on the portion of the spool or piston between the enlarged end flanges. The sleeve or ring contains a slot lengthwise thereof and is held expanded against the wall of the chamber by spring means. The peripheral surface of the sleeve contains cavities suitably located to connect ports in the wall of the chamber by shifting of the sleeve therein. In one form, coiled springs are placed under compression in the slot in suitable pockets formed in the wall of the slot to hold the sleeve expanded within the chamber. In this form, the sleeve contains symmetrically disposed, peripherally spaced elongate recesses long enough to subtend the ports in the wall of the chamber that are to be connected by shifting of the sleeve, and there are symmetrically disposed flats extending lengthwise of the sleeve situated between the sides of the slots and the ends of the recesses to lessen the overall bearing surface and hence to improve the mobility of the valve sleeve. A discontinuous shoulder diametrically opposite the slot separates the opposite ends of the recesses from each other. Alternatively, the sleeve is held expanded by a circular spring disposed under compression within the sleeve and there are notches formed at the ends of the sleeve diametrically opposite the slot which lessen the resistance of the sleeve to expansion. In this alternative form the sleeve contains spaced recesses in its peripheral surface located at one side, only, that is between the notches and the slot to accommodate a different porting of the chamber.

In both forms the sleeve is comprised of an elastomer which is easily machineable, is light in weight, has a low resistance to sliding friction, is long wearing, is resistant to chemical action and is readily available.

The invention will now be described in greater detail with reference to the accompanying drawings wherein:

FIG. 1 is an elevation, partly in section, of the valve assembly;

FIG. 2 is a vertical section taken on the line 2—2 of FIG. 1;

FIG. 3 is a partially developed view of a valve element showing the valve assembly in outline;

FIG. 4 is an elevation of one of the end blocks, to much larger scale, showing a sealing ring;

FIG. 5 is a fragmentary section taken on the line 5—5 of FIG. 4;

FIG. 6 is a perspective of the valve shoe removed from the assembly;

FIG. 7 is a transverse section of a valve assembly having a different porting arrangement than that shown in FIGS. 1 and 2, and illustrating an alternative form of valve shoe; and FIG. 8 is an elevation of the valve spool contained in the valve chamber of the valve assembly shown in FIG. 7, removed from the valve chamber, showing the valve shoe mounted thereon.

The valve assembly has in one form a body 10, herein shown as a block of metal of hexagonal cross-section, having flat side faces 12a to 12f and end faces 14 and 16. The kind of metal employed is important only in so far as it is compatible with the use of the valve and the shape and size will be dictated by manufacturing costs and use.

The body 10 contains lengthwise thereof, that is, parallel to the side faces, a cylindrical bore forming a chamber 18. The ends of the chamber 18 are covered by blocks 20 and 22 secured to the end faces 14 and 16 by bolts 28. The blocks have cylindrical bosses 24 and 26 at their inner sides which fit into the open ends of the cylindrical chamber. The inner faces of the bosses are ground flat and in planes at right angles to the longitudinal axis of the chamber. Each block 20, 22 contains centrally thereof a threaded hole 30, 32 extending from its outer side part way through, and a small diameter exhaust port 34, 36 at the bottom extending the remainder of the way through to the interior of the chamber 18. Threaded plugs 38 and 40 are screwed into the blocks and have at their outer ends heads 42, 44, by means of which their position in the holes 30, 32 may be adjusted. Each plug contains a smooth axial bore 46, 48 part way through, a hole 50, 52 of smaller diameter at the inner end of the bore extending the remainder of the way through the plug, and a conical seat 54, 56 at the inner end concentric with the hole 50, 52. Closures C', C'' comprising stems 62, 64, having conical parts 58, 60 at their inner ends for engagement with the conical seats 54, 56, are slidably supported in the plugs with their outer ends fixed to buttons 66, 68 fitted into the bores 46, 48. Springs 70, 72 are disposed about the stems between the bottoms of the bores and the inner sides of the buttons and are operative to hold the conical parts seated.

Optionally, the parts 58 and 60 at the inner ends of the stems are cylindrical, having right-circular sections, and are comprised of cylindrical sleeves of an elastomer mounted on the inner ends of the stems as disclosed in my copending application of even date.

A piston 82 of the spool type is mounted in the chamber 18 for free sliding movement lengthwise thereof and the body 10 has an inlet port 84 through its walls at the intersection of the side faces 12a and 12f, through which pressure fluid is permitted to enter the chamber 18 for the purpose of effecting movement of the piston, as will appear hereinafter. The outer end of the port 84 is enlarged and threaded and a threaded nipple 86 is screwed into it for connecting a conductor thereto. The port 84 enters the chamber 18 closer to the left end of the chamber than the right, as shown in FIG. 1, but is in such a position that even when the piston spool occupies the extreme right-hand position, the port will be in communication with the annular space between the flanges of the spool. There are two other pairs of ports 88, 90 and 92, 94, the ports of each pair being spaced arcuately relative to each other and axially relative to the inlet port 86. Each of the ports is provided with a nipple for connecting it to a conductor. As illustrated, the ports 88, 90 are located in the side faces 12a and 12b and the ports 92, 94 are located in the side faces 12e and 12f.

The spool or piston 82 has a smooth cylindrical intermediate portion 96 of smaller diameter than the chamber and enlarged end flanges 98—98 corresponding substantially in diameter to the chamber and which loosely fit the wall of the chamber. The ends, that is, the outer faces of the flanges are ground flat and in planes perpendicular to the longitudinal axis of the spool. Each flange contains one or more bleeder passages located close to its peripheral edge which may be inclined from the inner side toward the outer side.

As herein illustrated, the end faces of the chamber contain grooves 132, 134 concentric with the exhaust ports 34, 36 which are substantially half-circular in cross-section for receiving O-rings 128, 130. Optionally, the ends of the spool may contain the grooves 132, 134 instead of the ends of the chamber whereupon the O-rings will be supported by the spool. To facilitate mounting the O-rings in the grooves, vent holes can be drilled in the end faces of the cylinder or end faces of the spool to the bottoms of the grooves. The rings are secured in the grooves, whether they are mounted in the end faces of the chamber or on the end faces of the spool, by peening the edges of the grooves after the rings are inserted therein as indicated at *p* of FIG. 5. The O-rings are comprised of an elastomer such as neoprene.

The valve element in one form, as shown in FIGS. 1, 2, 3 and 6, is in the form of a relatively short sleeve 100 containing a gap lengthwise of it, providing a slot with spaced parallel facing walls 104—104, and is mounted on the intermediate portion of the spool for movement therewith. To assure such movement of the sleeve with the spool, the intermediate portion contains a peripheral groove 106 corresponding in width to the sleeve within which the sleeve is seated. One or more springs 108 are disposed under compression in recesses 110—110 in the walls of the slot and operate to spread the sleeve thereby holding its peripheral surface in intimate and substantially pressure-tight engagement with the interior wall of the chamber 18. The slot 102 permits the pressure entering the inlet port to be in constant communication with the portions of the chamber at each side of the sleeve. Flats 112—112 are formed lengthwise of the sleeve at each side of the slot 102 to assist in obtaining a better fit and to lessen the bearing surface and hence to give greater mobility. In the peripheral wall of the sleeve at each side and symmetrically with respect to the slot 102, there are arcuate recesses 114, 116, the ends of which are spaced from each other at the one end by a shoulder 118. The recesses 114, 116 are so positioned and of such peripheral length as to connect, respectively, the pairs of ports when shifted to the right or left within the chamber. The ports 88, 90 are connected by the recess 114 when the spool is situated at the right end of the chamber and the ports 92, 94 are connected by the recess 116 when the spool is situated at the left end of the chamber. The valve element, as shown in FIG. 6, is extremely simple to manufacture, is comprised of a readily available material and is characterized in that it is easily machineable, has a very low coefficient of friction, is long wearing, and is chemically resistant to acid and alkaline fluids. The sleeve is preferably comprised of a resin such as nylon, Dacron, or any other elastomer that is found suitable.

A valve assembly 10x embodying the same features but constructed somewhat differently is shown in FIGS. 6 and 7. In this form, the valve element 100x contains a gap lengthwise of it providing a slot 102 and is mounted on the intermediate portion of the spool 82 for movement therewith, the latter being provided with a peripheral groove 106 for receiving the sleeve. A circular spring 108x is disposed within the sleeve under compression so as to expand the sleeve into engagement with the wall of the chamber. To improve flexibility of the sleeve and hence expansion by the spring 108x, notches *n* are formed in the end of the sleeve diametrically opposite the slot 102. Because of the different arrangement of porting of the valve chamber 18, the peripheral recesses 114, 116 are located at one side of the sleeve only, it being understood however that these recesses may be placed wherever it is desirable for the purpose of porting. Conveniently, the sleeve is prevented from rotating on the spool by locating the slot 102 opposite the inlet port 84 and by providing a nub *b* at the inner end of the nipple 86 for engagement within the slot 102. The sleeve 100x is also comprised of an elastomer such as Teflon or nylon.

As thus constructed, and assuming that the valve assembly is connected by way of the nipple 86 to a source of pressure above atmospheric and that both of the closures C', C" are in their closed position, the pressure delivered through the port 84 to the interior of the chamber 18 will enter the annular space surrounding the spool 82 between the end flanges 98—98, and if the spool is in a position such that neither end is engaged with an end of the chamber, the same pressure will exist between the outer ends of the spool and the ends of the chamber so that the spool will not move in either direction. If now the left-hand closure is unseated by pressure applied to the button 66 to move the head 58 from its seat 54 and thus connect the left-hand end of the chamber by way of the exhaust ports 34 and 74 to the atmosphere, the sudden rush of the pressure away from the left end of the spool to the atmosphere will unbalance the pressure at opposite ends of the spool so as to shift the spool toward the end from which the pressure is being exhausted, that is, toward the left end to compress the O-ring 128 at that end of the cylinder thereby forming a seal at this end, closing the exhaust ports 34, 74 so that, even though the button 66 is held displaced, no further pressure can escape from this end. The bleeder passages help to accelerate movement of the spool toward the end from which pressure is being exhausted. The valve spool 82 will remain in this position regardless of what is done with respect to the button 66 at the left-hand end until the pressure is unbalanced by permitting escape from the right-hand end through the exhaust ports 36 and 76 at the right-hand end. This is achieved only by pressing the button 68 at the right-hand end toward the left so as to unseat the head 60 from the seat 56. As explained previously, the spool will thus shift to the right, engage the O-ring 130 at the right end of the chamber thus cutting off further exhaust from this end, and will remain in this position regardless of any further manipulation of the button 68 until the button 66 at the left end is again displaced.

Displacement of the spool 82 carries with it the sleeve 100 or 100x, according to the form of the valve assembly, to connect or disconnect the ports in the walls of the chamber.

As previously indicated, the valve element such as the sleeve 100 is comprised of an elastomer such as nylon or Dacron however it is to be understood that it may be comprised of any synthetic resin of corresponding characteristics.

The term "fluid" is used herein to denote liquids or gases and hence to cover use of the assembly for the control of hydraulically or pneumatically operated mechanisms or systems.

It should be understood that the present disclosure is for the purpose of illustration only and that this invention includes all modifications and equivalents which fall within the scope of the appended claims.

I claim:

1. In a valve assembly, the combination with a valve element, of a piston operable to effect shifting of the valve element, of an elongate valve chamber within which the piston is freely slidable, said chamber containing in its wall, intermediate its ends, an inlet port through which pressure is supplied to the chamber, and circumferentially spaced ports for interconnection, and in its end walls exhaust ports through which pressure within the chamber can be exhausted, and of means for unbalancing the pressure at the ends sufficiently to shift the piston toward the end from which the pressure is exhausted; characterized in that the valve element encircles the piston and is movable thereby, that the encircling portion of the valve element contains a slot axially thereof which connects the portions of the chamber at the opposite ends of the valve element to each other, and a recess in the peripheral surface thereof operative to connect the circumferentially spaced ports in the wall of the chamber when said valve element is shifted to a position into alignment with said circumferentially spaced ports, said encircling portion of the valve element being a hollow cylindrical sleeve split lengthwise to form a gap and disposed about the piston, having a peripheral wall concentric with the inside of the cylinder and means yieldably expanding the sleeve within the chamber so as to hold its cylindrical surface in intimate contact with the wall of the chamber.

2. A valve assembly according to claim 1, wherein the expanding means includes spring means situated in the gap yieldably expanding the sleeve within the chamber.

3. A valve assembly according to claim 1, wherein the expanding means includes a circular spring situated within the sleeve yieldingly expanding the sleeve within the chamber.

4. A valve assembly according to claim 1, wherein the gap constitutes a passage from one end of the sleeve to the other, connecting the portions of the chamber at opposite ends of the sleeve to each other.

5. A valve assembly according to claim 1, wherein the sleeve has notches at the opposite ends of the sleeve diametrically opposite the gap.

6. In a valve assembly, the combination with a valve element, of a piston operable to effect shifting of the valve element, of an elongate valve chamber within which the piston is freely slidable, said chamber containing in its wall, intermediate its ends, an inlet port through which pressure is supplied to the chamber, and circumferentially spaced ports for interconnection, and in its end walls exhaust ports through which pressure within the chamber can be exhausted, and of means for unbalancing the prssure at the ends sufficiently to shift the piston toward the end from which the pressure is exhausted; characterized in that the valve element encircles the piston and is movable thereby, and that the encircling portion of the valve element is a hollow cylindrical elastomeric sleeve which contains a slot axially thereof which connects the portions of the chamber at the opposite ends of the valve element to each other, and a recess in the peripheral surface thereof operative to connect the circumferentially spaced ports in the wall of the chamber when said valve element is shifted to a position into alignment with said circumferentially spaced ports.

7. A hollow cylindrical part split transversely of its cylindrical wall, the opposed ends of the wall, where the split is located, containing pockets, springs disposed in the pockets operative to hold the cylindrical part expanded, a flat at each side of the split on the outer surface of the wall widthwise of the part, and circumferentially extending recesses in the wall commencing at one end adjacent the flats and terminating at their other ends in spaced relation, the portion of the wall between said ends being uniformly cylindrical widthwise of the part.

References Cited by the Examiner
UNITED STATES PATENTS

| | | | |
|---|---|---|---|
| 1,791,613 | 2/1931 | Clay | 251—31 |
| 2,591,031 | 4/1952 | Volpin et al. | 251—182 X |
| 2,616,449 | 11/1952 | Maha | 251—31 X |
| 2,856,150 | 10/1958 | McDonald | 251—182 |
| 3,004,557 | 10/1961 | Wiegers | 251—31 X |

M. CARY NELSON, *Primary Examiner.*

E. K. FEIN, *Assistant Examiner.*